(12) United States Patent
Kumar

(10) Patent No.: US 6,873,888 B2
(45) Date of Patent: Mar. 29, 2005

(54) METHOD AND SYSTEM FOR IMPROVING ACCELERATION RATES OF LOCOMOTIVES

(75) Inventor: Ajith Kuttannair Kumar, Erie, PA (US)

(73) Assignee: General Electric Company

( * ) Notice: Subject to any disclaimer, the term of this patent is extended or adjusted under 35 U.S.C. 154(b) by 28 days.

(21) Appl. No.: 10/358,661

(22) Filed: Feb. 5, 2003

(65) Prior Publication Data

US 2004/0153221 A1 Aug. 5, 2004

(51) Int. Cl.⁷ .............................................. G05D 13/00
(52) U.S. Cl. .......................................... 701/19; 701/20
(58) Field of Search .............................. 701/19, 20, 93, 701/100, 101, 102, 104, 105, 110; 123/339.189

(56) References Cited

U.S. PATENT DOCUMENTS

| | | | |
|---|---|---|---|
| 2,010,469 A | * | 8/1935 | Triebnigg .................... 123/26 |
| 3,209,704 A | * | 10/1965 | Gratzmuller ................. 105/35 |
| 6,021,370 A | | 2/2000 | Bellinger et al. |
| 6,725,134 B2 | * | 4/2004 | Dillen et al. .................. 701/19 |

\* cited by examiner

*Primary Examiner*—Thomas G. Black
*Assistant Examiner*—Christine M. Behncke
(74) *Attorney, Agent, or Firm*—Carl Rowold, Esq.; Terry M. Sanks, Esq.; Beusse, Brownlee, Wolter, Mora & Maire, P.A.

(57) ABSTRACT

In a railroad locomotive having a diesel engine and an electro-motive propulsion system for transforming and transmitting power from the engine to wheels of the locomotive for propelling the locomotive, a method of reducing the time required to transmit power at a predetermined level of power to the wheels to propel the vehicle comprising increasing engine speed to approximately a maximum engine speed prior to transmitting power generated by the engine to propel the locomotive, and thereafter controlling the electro-motive propulsion system to transfer power from the engine to the locomotive wheels to propel and accelerate the locomotive.

32 Claims, 17 Drawing Sheets

Auxiliary HP (corresponding to Figure 6 (aux off)) (sec)

Auxiliary HP(corresponding to Figure 13 (combined modulation)) (sec)

Tractive Effort corresponding to Figure 13
(combined modulation)) (sec)

US 6,873,888 B2

METHOD AND SYSTEM FOR IMPROVING ACCELERATION RATES OF LOCOMOTIVES

BACKGROUND OF THE INVENTION

The present invention relates to locomotives, and more particularly to a method that safely increases a locomotive's acceleration rate when the locomotive is increasing to full horsepower.

Depending on a geographic region, locomotives used for passenger applications make more frequent stops for shorter periods of time when compared to locomotives used for freight applications. Freight trains usually travel from one city to another, where the cities are several hundred miles apart. Freight trains generally do not make periodic stops between a starting and final destination. Thus starting a freight locomotive may take considerable time, such as over a minute, to accelerate to full horsepower and/or to a desired horsepower. Even though there are passenger trains that also travel between cities separated by hundreds of miles, many passenger trains are also used within a city wherein they make scheduled stops a few blocks, such as two miles, apart at stations where passengers embark and debark the train. Each time a passenger train departs from a station, it typically takes between 40 to 60 seconds to accelerate to full horsepower, due to engine loading limitations or engine load rates.

Freight trains and passenger trains use the same railroad tracks. To avoid accidents, such as having a freight train overtake a passenger train stopped at a station or while slowly accelerating after leaving a station, trains are scheduled to allow for a given amount of time, such as 2 minute intervals, between them. With respect to the stops made by passenger trains, scheduling the use of a track must include considering the time a passenger train must spend at each station as well as the time it takes for the passenger train to accelerate from a stopped position to a normal traveling speed. Otherwise, train schedules can be thrown off and train intervals greatly affected.

Currently train schedules for railroad tracks in which both passenger locomotives and freight locomotives use are limited by the time passenger locomotives need to stop and then start again, including the time it takes for them to reach full horsepower after leaving a station. If a passenger train could accelerate faster when leaving a station, not only does the chance of slowing down other trains lessen, but schedules can be revised where more trains could use the track over a given time period.

BRIEF SUMMARY OF THE INVENTION

This invention is directed to a method and system for improving a time a vehicle, such as a locomotive, takes to achieve a desired, or full, horsepower. Towards this end, a preferred method comprises increasing engine speed to approximately a maximum engine speed prior to transmitting power generated by the engine to propel the locomotive. After this is done, the propulsion system is controlled to transfer power from the engine to the locomotive wheels to propel and accelerate the locomotive.

In another preferred embodiment the method comprises transferring non-propulsive power at a predetermined level of power from an engine of a locomotive to a non-propulsive electric power end user device, such as but not limited to a dynamic braking grid, an auxiliary power end use device and a head end power inverter. This transfer is accomplished by a non-propulsive electric energy generating system on the locomotive. The transfer is accomplished prior to transferring propulsive power from the engine to the locomotive's wheels to propel the locomotive.

A system for improving the time a locomotive takes to achieve a desired horsepower is also disclosed. The system comprises a processor and an auxiliary control software residing in the processor. The auxiliary control software comprises a plurality of algorithms for implementing a plurality of procedures for improving the acceleration rate. A controller system is also provided, connected to the processor, which controls dynamic brake system and an engine of the locomotive. The processor selects one of the plurality of algorithms based on an operating condition of the locomotive and directs the controller system based on the one algorithm selected. The processor may make its determination based on internal information, or from external inputs such as track sensors, information provided by wayside stations, etc.

BRIEF DESCRIPTION OF THE DRAWINGS

The invention itself, both as to organization and method of operation, may best be understood by reference to the following description in conjunction with the accompanying drawings in which like numbers represent like parts throughout the drawings and in which.

DETAILED DESCRIPTION OF THE INVENTION

With reference to the figures, exemplary embodiments of the invention will now be described. The scope of the invention disclosed is applicable to a plurality of mobile assets. Thus, even though embodiments are described specific to locomotives, this invention is also applicable to other mobile assets, such as buses and off road vehicles, in which improved acceleration of the mobile assets is desired. Furthermore, certain time values and output values are used to disclose the present invention. One skilled in the art will recognize that these values are provided as illustrations only and that a plurality of other exemplary values may be used, ones that are best suited to the mobile asset and the components, or subsystems that comprise the mobile asset. Additionally, even though one skilled in the art might assume that at time 0, the locomotive is at rest, or is stationary, this is not necessarily true. The scope of this invention also applies to locomotives in motion wherein a user wishes to accelerate to a higher or full horsepower.

Figure 1:
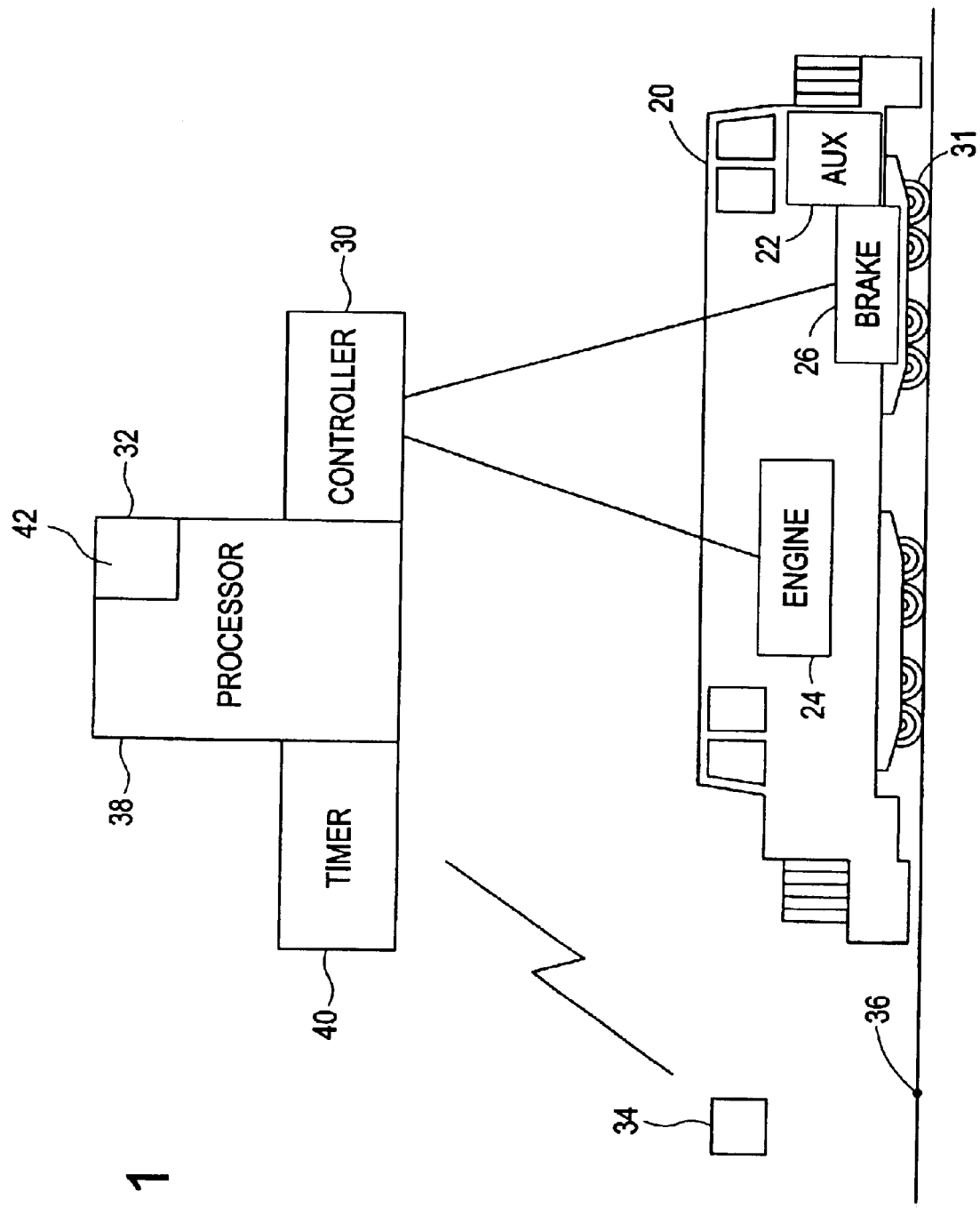
FIG. 1 is an exemplary embodiment of a diesel locomotive comprising a block diagram of the present invention.
Figure 11:
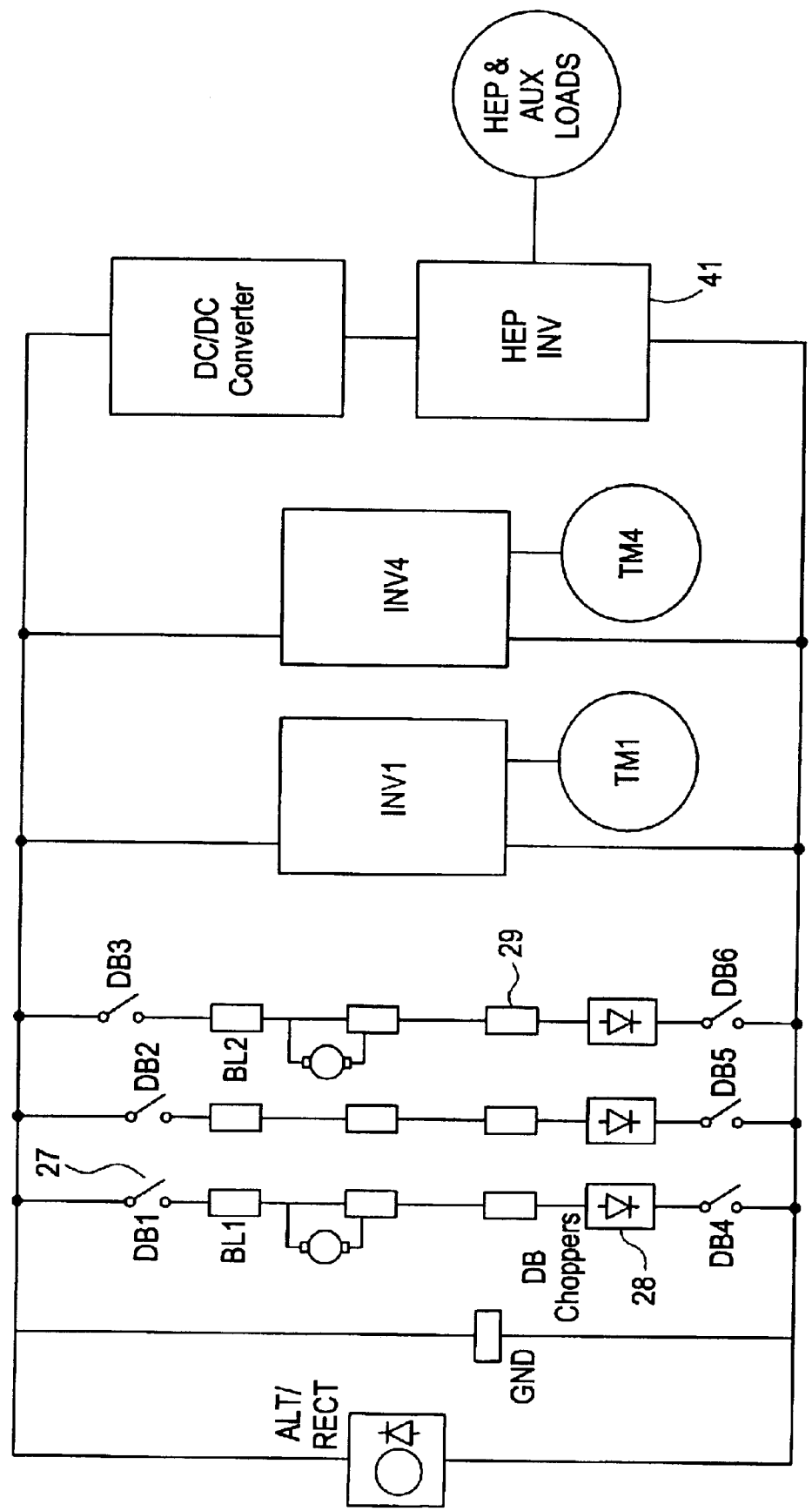
FIG. 11 is an illustration of an exemplary embodiment of a brake system of a locomotive with dynamic brake grids.

FIG. 1 is an embodiment of a diesel locomotive comprising the present invention. The locomotive 20 may be either an AC or DC locomotive. The locomotive 20 is comprised of several complex systems, including an engine 24, an electro-motive propulsion system for transforming and transmitting propulsive power from the engine 24 to the wheels 31, auxiliary loads, or non-propulsive electric energy generating systems, 22, and a dynamic brake system 26 which is further illustrated in FIG. 11. Some of locomotive's systems work independent of the other systems, whereas others interact with other systems. The dynamic brake system 26, further illustrated in FIG. 11, is unique to a passenger locomotive since a Head End Power (HEP) inverter 41 is part of this system. The HEP inverter 41 provides the electricity for "hotel" power (non-traction, or non-motive power uses) needed by the train.

Figure 2:
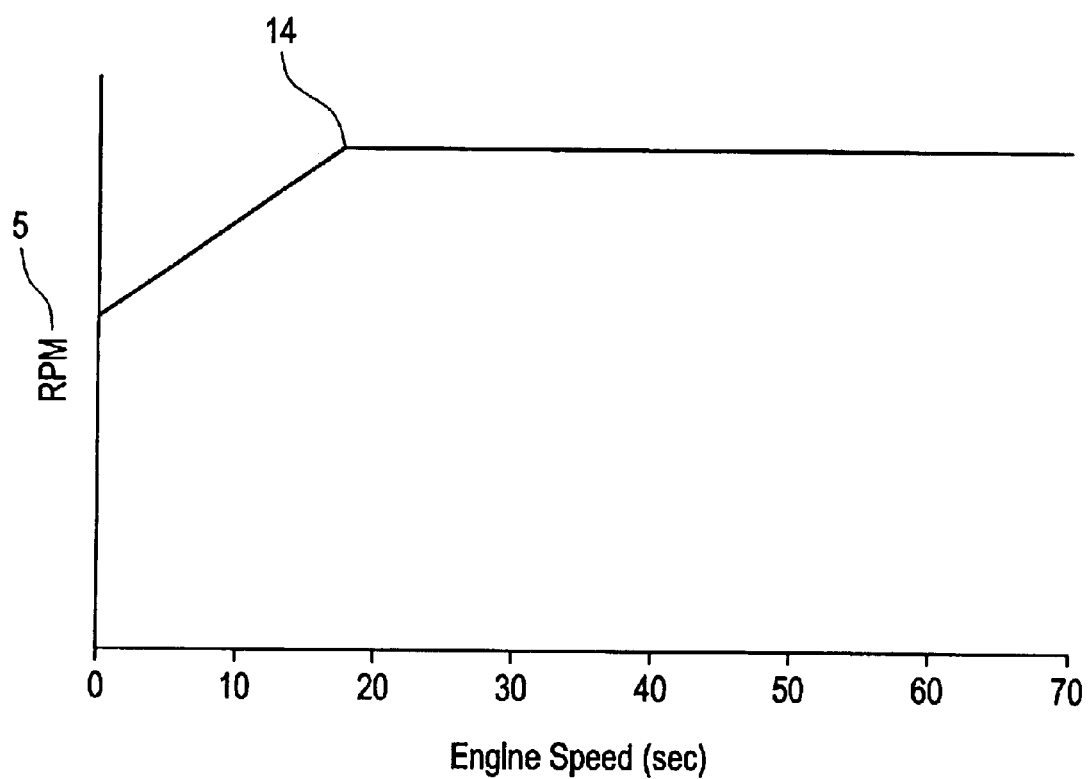
FIG. 2 is a prior art graphs representing an exemplary illustration of a locomotive engine's speed as a function of time.
Figure 3:
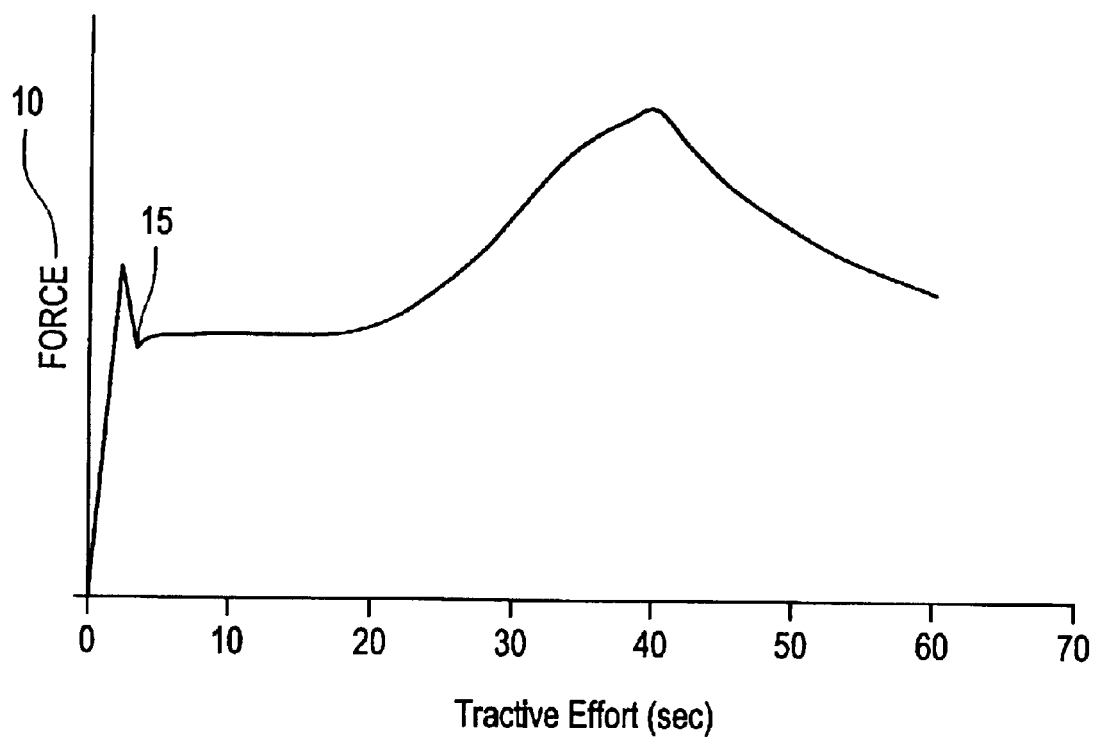
FIG. 3 is a prior art graph representing an exemplary illustration of a locomotive engine's tractive effort as a function of time.
Figure 4:
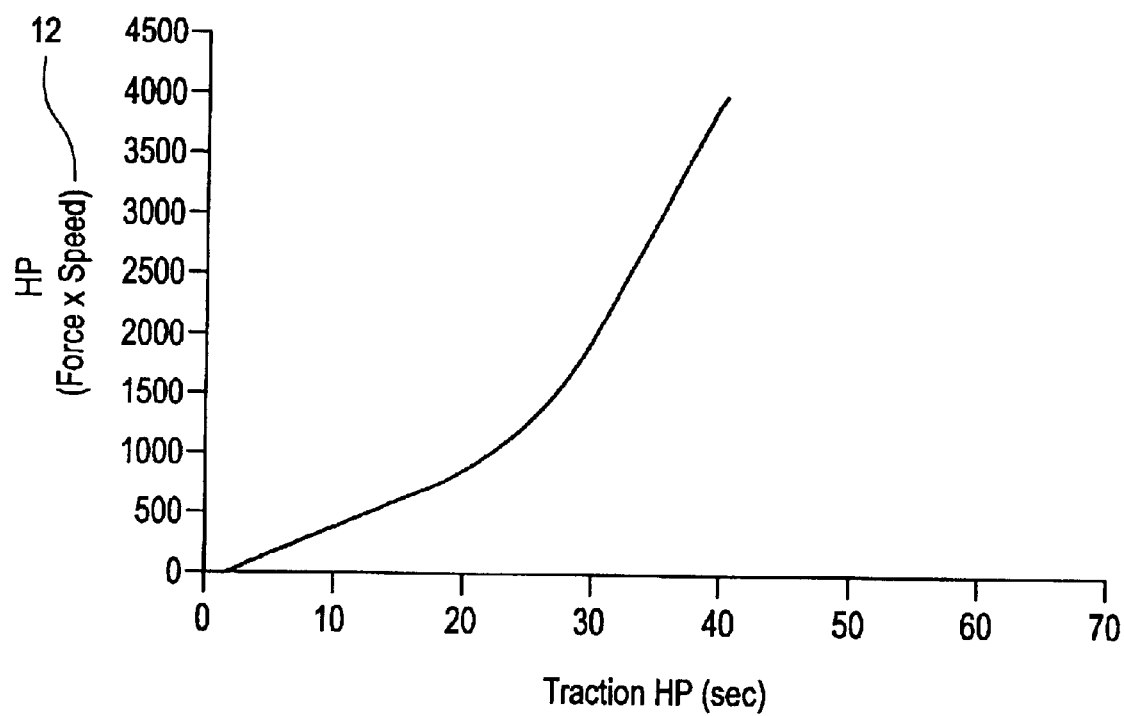
FIG. 4 is a prior art graph representing an exemplary illustration of a locomotive engine's traction horsepower as a function of time.

To improve a locomotive's acceleration, two parameters that are essential are an engine's speed and an engine's load. FIGS. 2, 3, and 4 are prior art graphs representing exemplary illustrations of an engine's speed 5, tractive effort, and traction horsepower as a function of time, respectively, of a locomotive. Tractive effort is force 10, which defines how fast an axel is turning or an axel rating. Horsepower 12 is force times speed. As illustrated in FIG. 2, even though an engine's speed is at its top operating speed 14 in less than 40 seconds, as illustrated in FIGS. 3 and 4, the locomotive 20 does not reach full horsepower until slightly after 40 seconds. These graphs assume that the locomotive 20 is commanded to operate at full horsepower, such as Notch 8, at a time 0, or prior to starting to accelerate. As illustrated in FIG. 3, a dip 15 in tractive effort occurs between a time 3 seconds and 40 seconds due to an ability to achieve a full load, such as the load resulting from a turbo charger, while the speed is increasing. In order words, the dip is caused by an increase in speed whereas the tractive effort has now lessened because the tractive force and speed are no longer constant.

Figure 5:
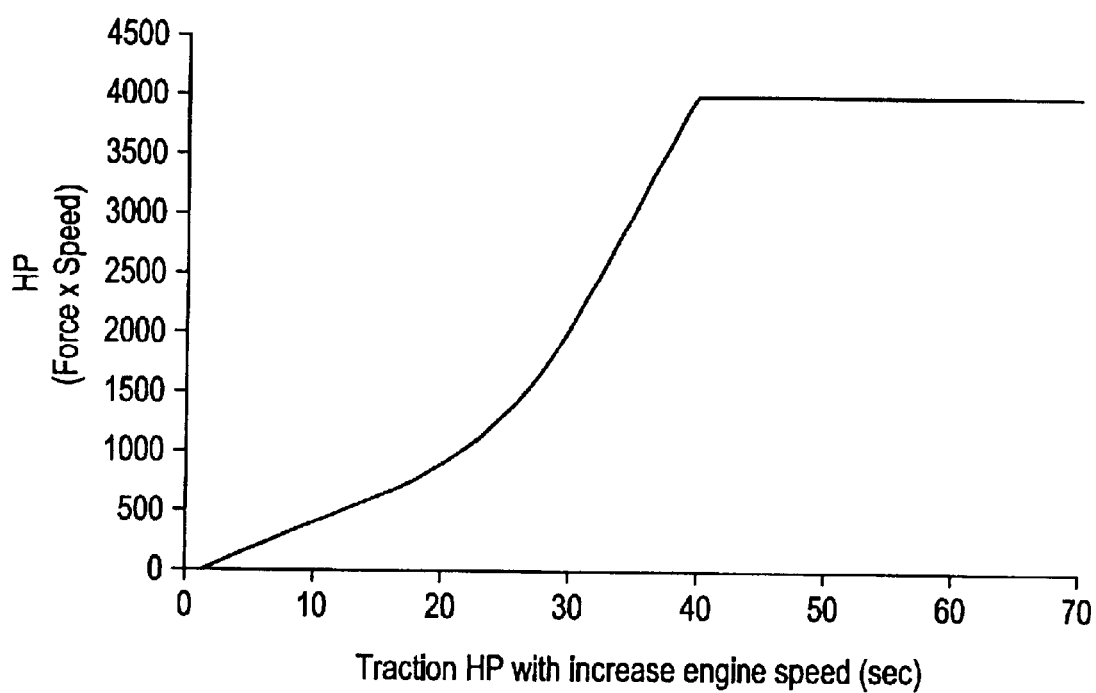
FIG. 5 is an exemplary embodiment of a graph illustrating an improved traction horsepower as a function of time when using a preferred embodiment of the present invention.

FIG. 5 is an exemplary embodiment of a graph illustrating an improved traction horsepower as a function of time when using a preferred embodiment of the present invention. In this preferred embodiment, an engine speed is increased to a maximum level prior to starting to accelerating the locomotive. Providing the increased engine speed prior to starting the locomotive increases the tractive horsepower 12 rate slightly, such as compared to the prior art graph of FIG. 4, wherein the originally time period to reach full horsepower was 40.1 seconds, but with applying the preferred embodiment disclosed in FIG. 5, the time period drops to 39.6 seconds.

Figure 6:
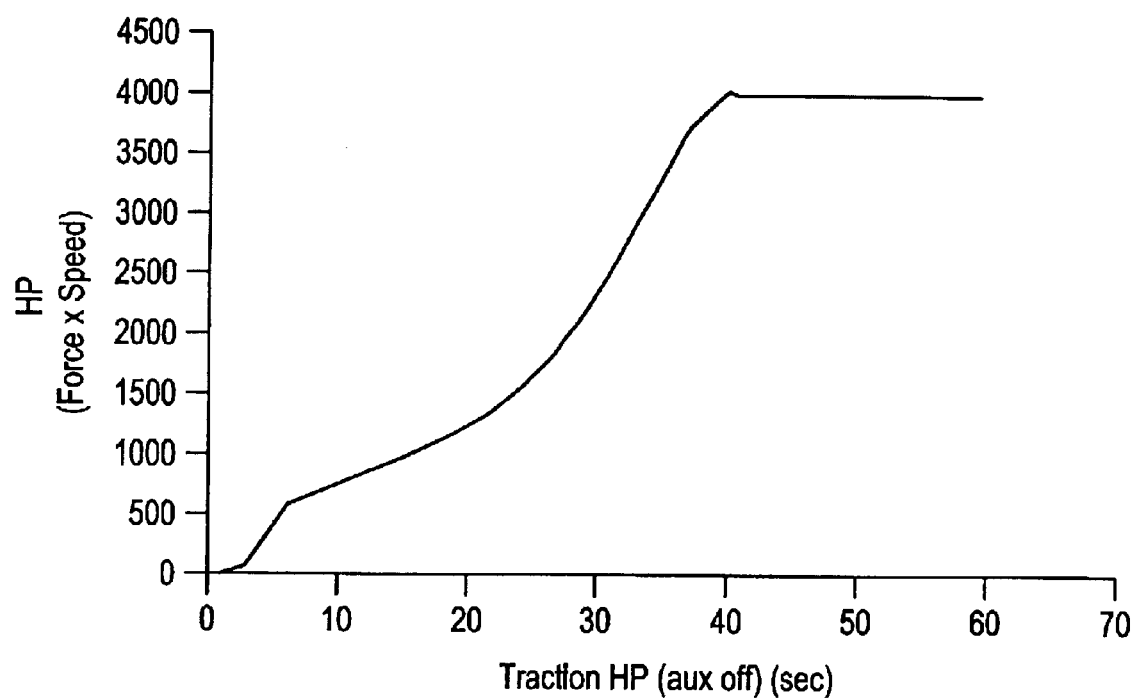
FIG. 6 is another exemplary embodiment of a graph illustrating an improved traction horsepower over time when using a preferred embodiment of the present invention.
Figure 7:
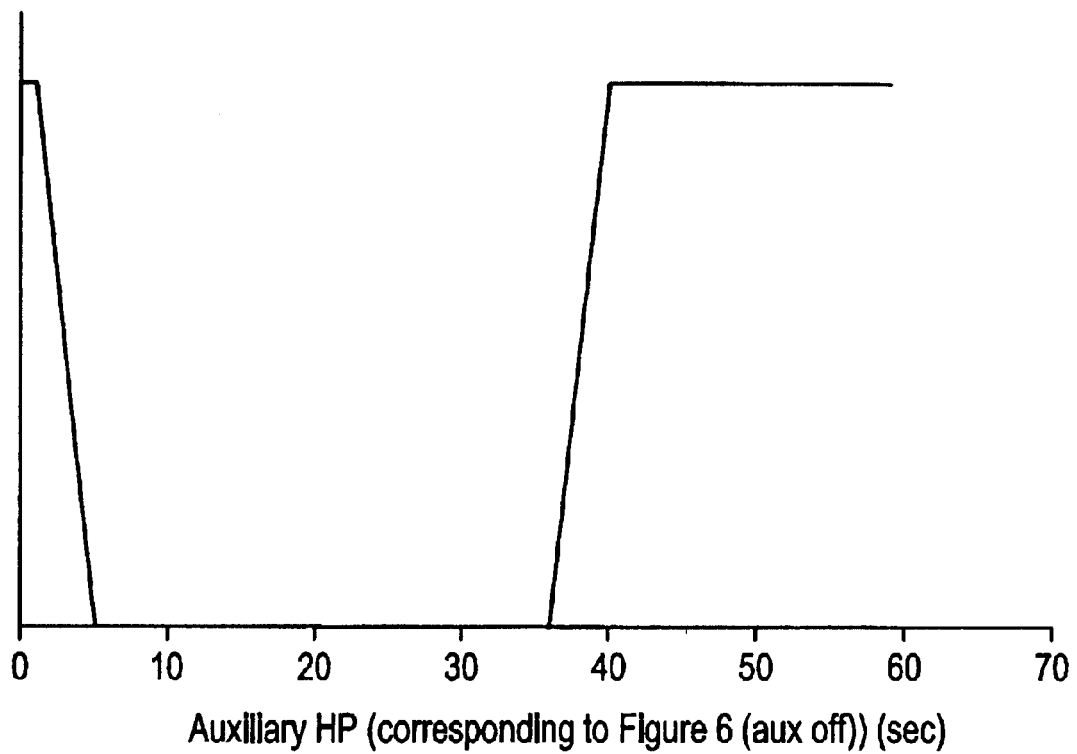
FIG. 7 is a graph of an auxiliary horsepower corresponding to FIG. 5.

FIG. 6 is another exemplary embodiment of a graph illustrating an improved traction horsepower 12 over time when using a preferred embodiment of the present invention. Auxiliary power, or non-propulsive power, as illustrated in FIG. 7, is removed at 2 seconds and then applied again at 37 seconds wherein the auxiliary horsepower reaches its desired operating level after approximately 40 seconds. Between the time period of 2 seconds and 37 seconds, no auxiliary power is applied. Applying this preferred embodiment improves full horsepower 12 from 40.1, as disclosed in prior art FIG. 4, to about 39 seconds, as disclosed in FIG. 6. In another preferred embodiment, a part of the auxiliary power is always applied, only the amount of auxiliary power varies depending on how much is needed for traction purposes.

Figure 8:
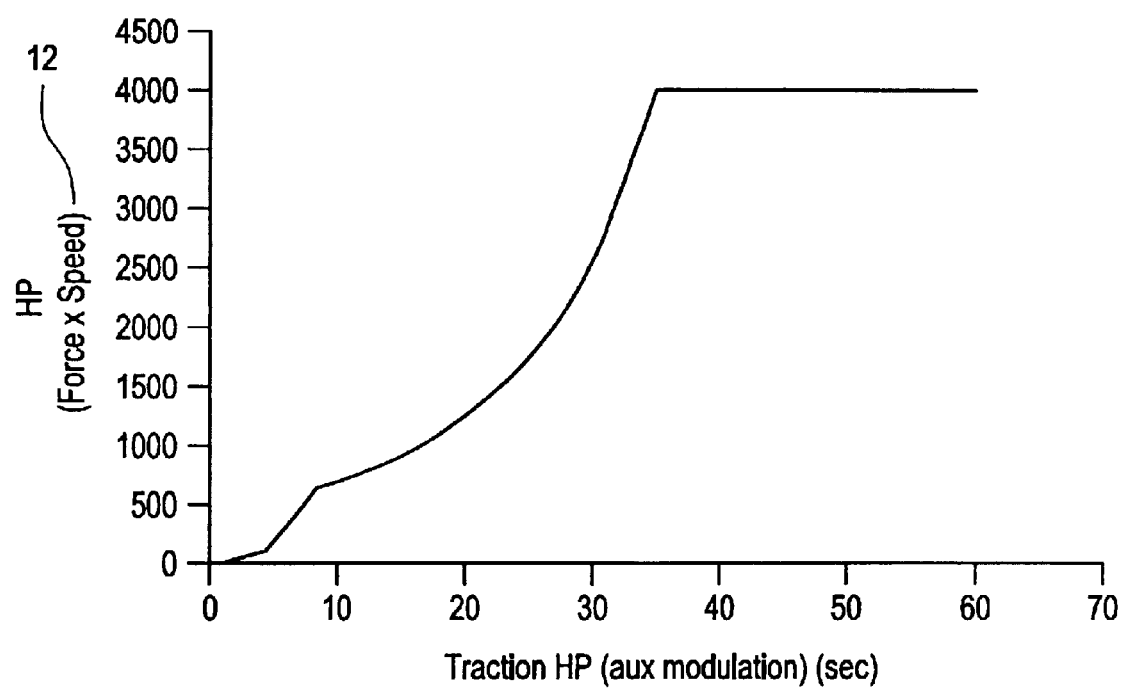
FIG. 8 is an exemplary embodiment of a graph illustrating an improved traction horsepower over time when using a preferred embodiment of the present invention.
Figure 9:
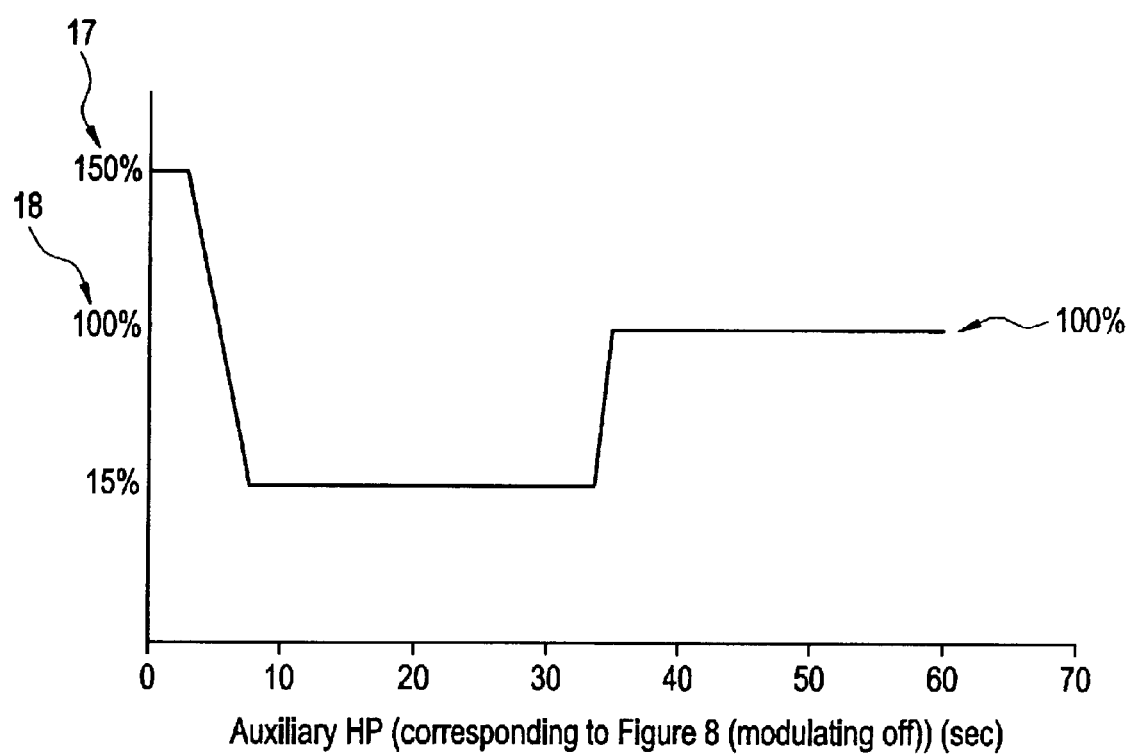
FIG. 9 is an exemplary embodiment of auxiliary horsepower that is modulated.

FIG. 8 is another exemplary embodiment of a graph illustrating an improved traction horsepower over time when using a preferred embodiment of the present invention, and FIG. 9 is an exemplary embodiment of auxiliary horsepower that is modulated. The auxiliary horsepower is increased prior to starting the locomotive 20. In a preferred embodiment, the auxiliary horsepower provided before starting the locomotive 20 can be achieved by auxiliary loads 22, such as by turning on blowers and/or other loads which are usually off when the locomotive starts, or by increasing the speed of the blowers even though it may not be needed for cooling equipment. Some loads are usually dropped, or turned off, during acceleration. Other loads include, but are not limited to, battery chargers, heating and air conditioning equipment, etc. The ideal load equipment 22 is those with large time constants which are not necessarily affected by many seconds of reduction or increases of power.

As illustrated in FIG. 9, in a preferred embodiment, the auxiliary horsepower is started at a high load, above a normal operation level such as 150% 17. The load is then dropped to an operating level below the normal operating level between the 4 to 7 second period, such as, but not limited to, 15%. The load is then increased to the normal, or steady state, load level, such as to 100% 18, during the period of 34 seconds to 35 seconds. The auxiliary horsepower then reaches a desired value after approximately 35 seconds. As illustrated in FIG. 8, modulating the auxiliary horsepower in this fashion improves the time to achieve full horsepower to 35 seconds after starting the locomotive from rest.

Figure 10:
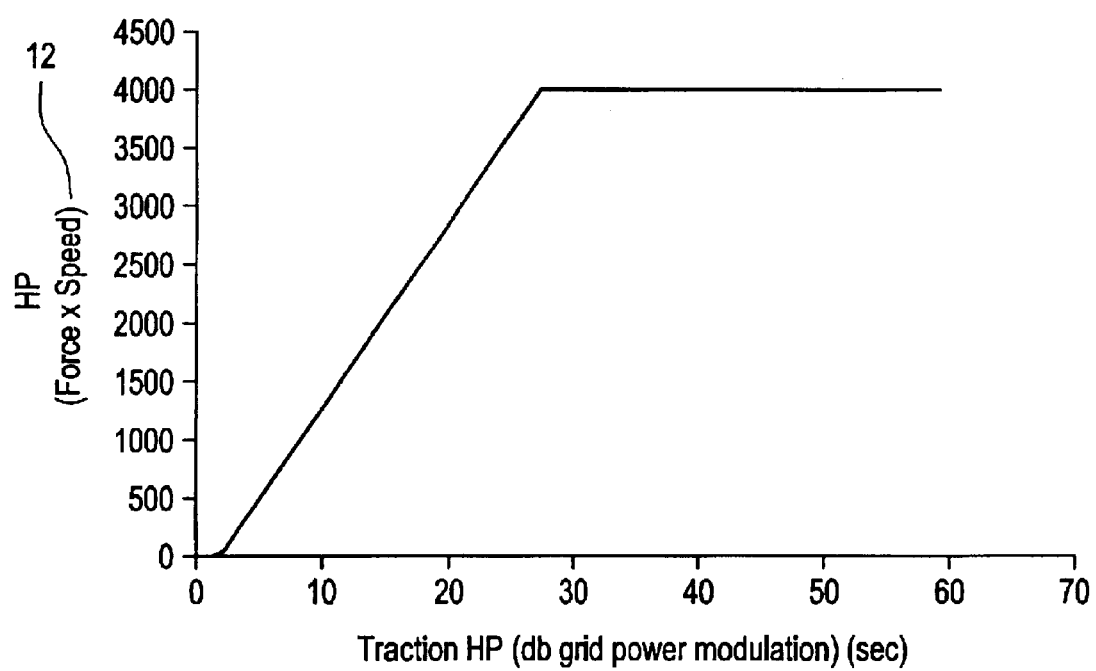
FIG. 10 is an exemplary embodiment of a graph illustrating an improved traction horsepower over time when using a preferred embodiment of the present invention.

FIG. 10 is another exemplary embodiment of a graph illustrating an improved traction horsepower 12 over time when using a preferred embodiment of the present invention. In this embodiment a locomotive engine 24 is loaded with dynamic brake grids 27 of the locomotive's dynamic brake system 26, illustrated in FIG. 11, and then the load drops off as required. As further illustrated in FIG. 11, the grid resistors 29 connected to the direct current (DC) bus are modulated by chopper circuits 28. The chopper circuits 28 regulate DC link voltage during braking by drawing power as needed from the DC bus.

Figure 12:
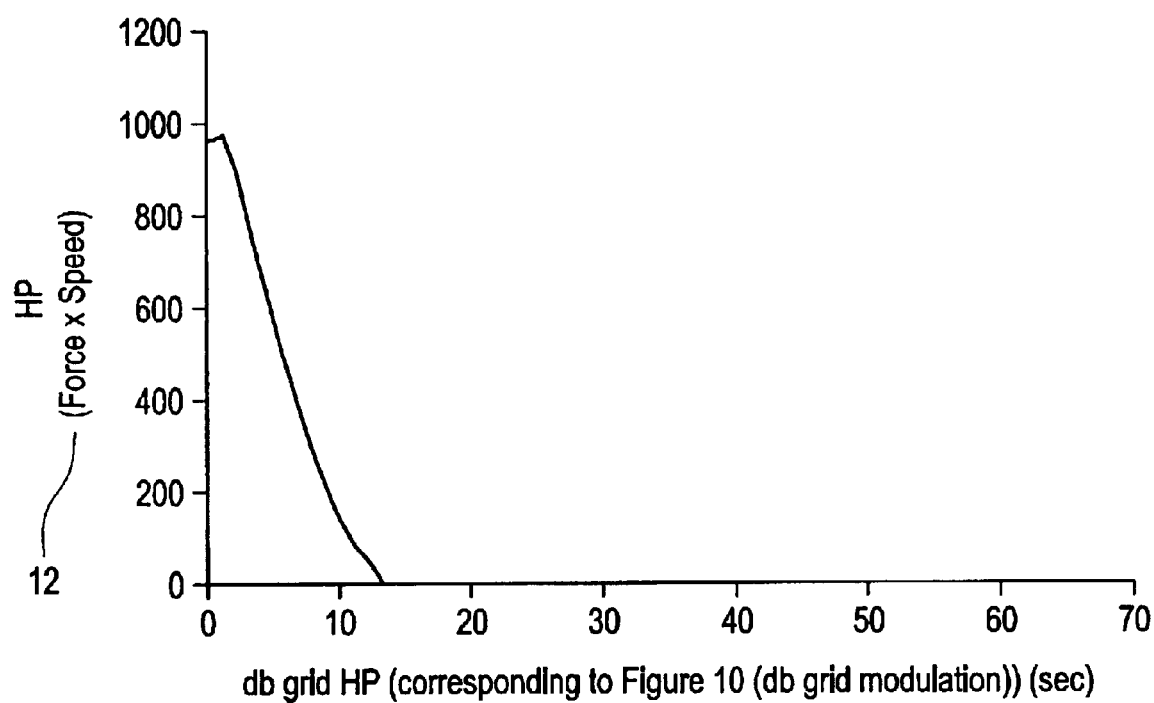
FIG. 12 is an exemplary embodiment of a graph illustrating the dynamic brake grid horsepower consumed as a function of time.

An exemplary embodiment of a graph illustrating the dynamic brake grid horsepower consumed over time is illustrated in FIG. 12. In a preferred embodiment, the auxiliary horsepower is kept constant at a normal rate over a given time period. The dynamic braking horsepower is increased during the first few seconds when the engine can load faster than the traction demand. The dynamic braking horsepower then decreases to 0 during the period of 2 seconds to 12 seconds. A typical dynamic brake grid produces from 4000 to 5000 horsepower. In the present invention, approximately 20% of the braking power, or about 960 horsepower, is applied, which provides fully loaded traction. As illustrated in FIG. 10, the total time to achieve full horsepower decreases to 25 seconds, since in the present illustration the locomotive has now reached its maximum acceleration rate. As one skilled in the art will readily recognize, this time can be improved upon if the locomotive 20 accelerates at a faster rate, or where the locomotive is not limited by tractive effects and engine capacity.

Figure 13:
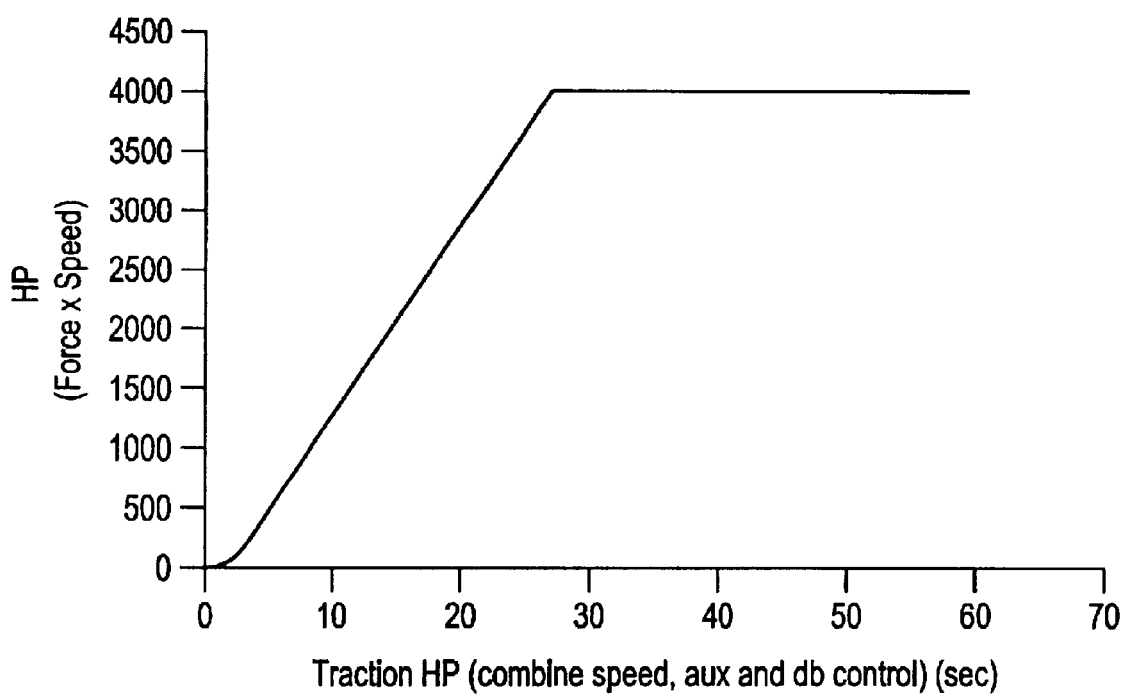
FIG. 13 is an exemplary embodiment of a graph illustrating an improved traction horsepower over time when using a preferred embodiment of the present invention where a combination of the prior discussed embodiments are used.
Figure 14:
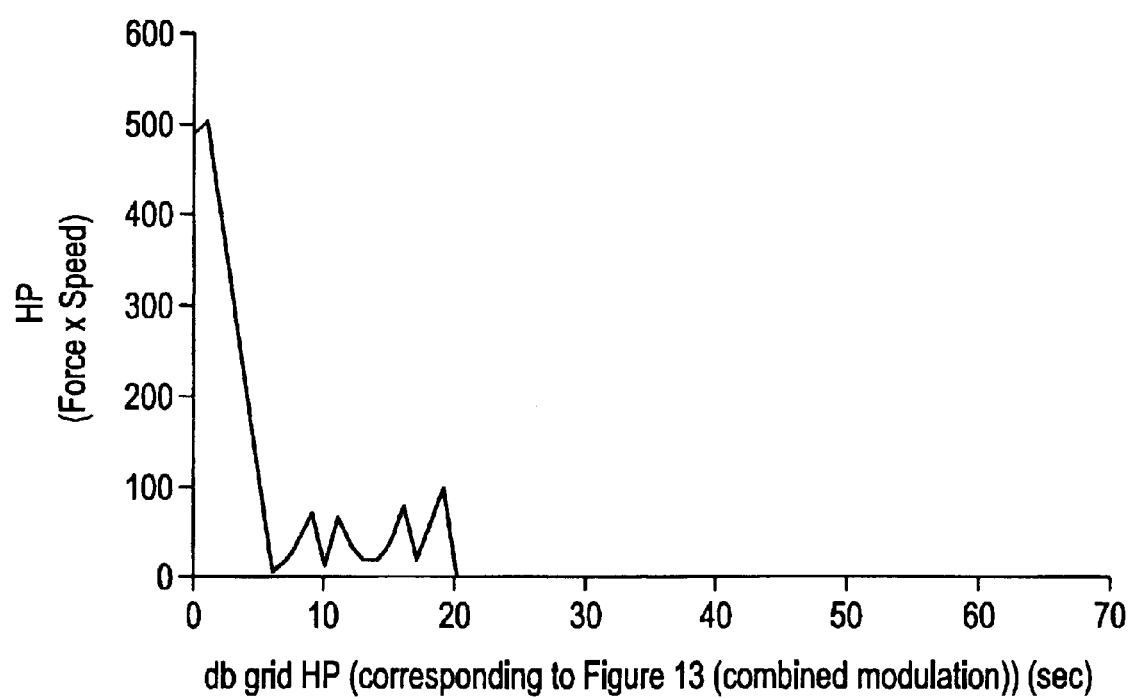
FIG. 14 is an illustration of an exemplary graph of a grid horsepower as a function of time.
Figure 15:
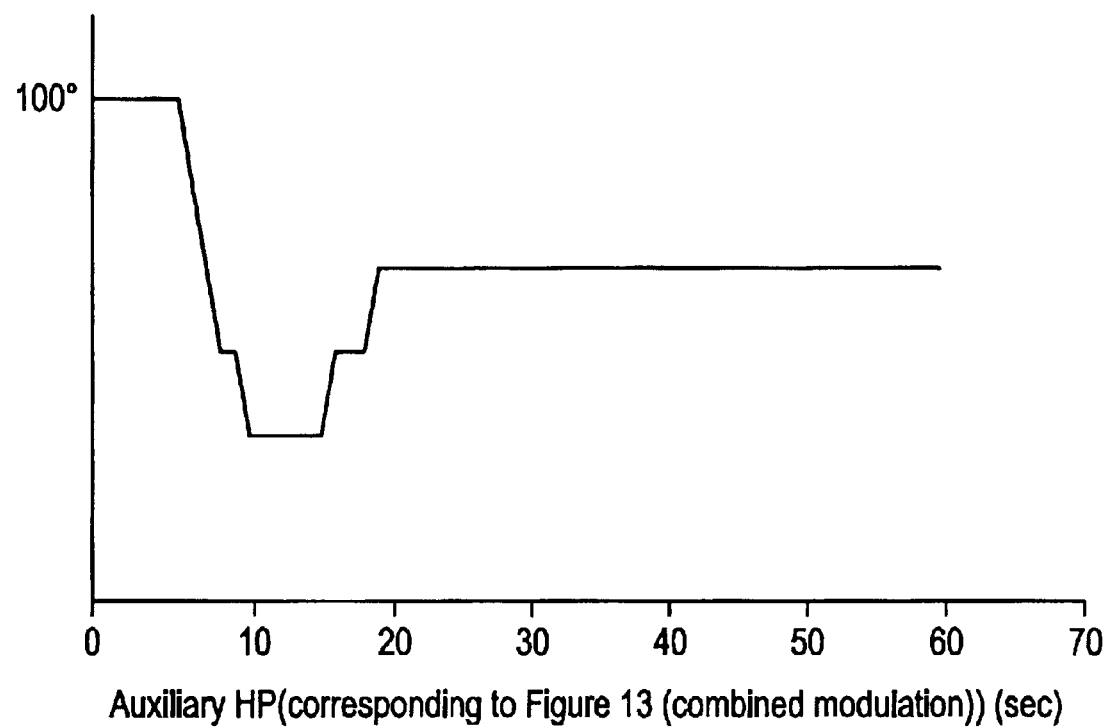
FIG. 15 is an illustration of an exemplary graph of auxiliary horsepower consumed as a function of time.
Figure 16:
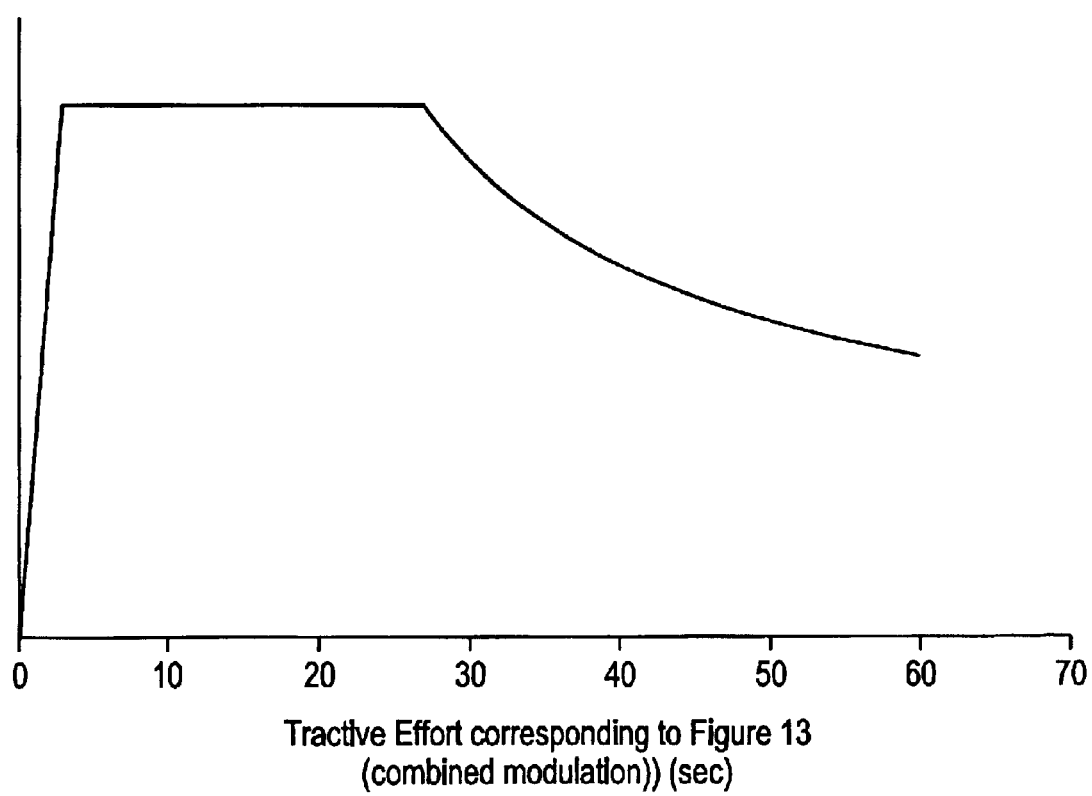
FIG. 16 is an illustration of an exemplary graph of tractive effort produced as a function of time.

FIG. 13 is another exemplary embodiment of a graph illustrating an improved traction horsepower over time when using a preferred embodiment of the present invention where a combination of the prior discussed embodiments are used. Specifically, the engine speed is increased, an auxiliary load is modulated, and the engine is loaded with dynamic brake grids before starting, all as disclosed previously. The dynamic brake grids and auxiliary loads are then modulated or decreased as required. Unlike the previously discussed embodiment, in this embodiment approximately half of the prior dynamic brake grid 27 horsepower, such as from 490 to 500 horsepower, is needed. Using less horsepower improves fuel efficiency when compared to the prior embodiment. FIGS. 14, 15, and 16 are exemplary illustrations of the grid horsepower, the auxiliary horsepower consumed, and the tractive effort produced, respectively, all over time. As illustrated in FIG. 14, the dynamic brake grid horsepower increases during the first few seconds, a period where the engine can load faster than the traction demand. It then decreases, close to 0, during the period of 2 seconds to 20 seconds. As illustrated in FIG. 15, the auxiliary horsepower starts above a normal load level, such as at 150%, then decreases below the normal load level, between the 6 seconds period to the 11 seconds period. The auxiliary horsepower then increases to a normal load during the period of 17 seconds to 20 seconds. Meanwhile, the dynamic braking grids are modulated to keep the engine-loading rate at a maximum rate while the traction horsepower increases and the auxiliary load is turned on/off, as illustrated in FIG. 16. In this preferred embodiment, the total time to get to full horsepower is approximately 25 seconds.

The initialization of any of the preferred embodiments are accomplished a plurality of ways. Within a locomotive 20, a dynamic brake controller system 30 and auxiliary control software 32 are used to implement the present invention. In one embodiment, one of the above-discussed embodiments is initiated before departure from a station either by an automatic switch, manual switch, or by closing of a door on passenger cars (such as detecting when the passenger car doors have been commanded to close). In another preferred embodiment, an outside input is provided, an input device external to the processor 38, a railroad track sensor 36, a device which is monitoring locomotive position information 34 (one that may utilize a global positioning system), which makes the determination as to which of the preferred embodiments are used.

In other preferred embodiments, a determination to use one of the preferred embodiments is self-regulated. In other words, the determination to use one of the previously discussed preferred embodiments is preprogrammed into a processor 38 on the locomotive 20. In one preferred embodiment, if the route and/or timing constraints are known, one of the above discussed embodiments are then initialized at predetermined stations and/or times. In another preferred embodiment, after coming to a scheduled stop, a timer 40 is used to calculate how long the locomotive is at the given stop or station. If the locomotive 20 is stationary beyond a given time period, the processor 38 determines which of the above discussed embodiments to use in assisting the locomotive 20 with staying on schedule.

As further illustrated in FIG. 1, the present invention comprises a processor 38. The processor 38 will regulate which acceleration improvement method is implemented. Auxiliary control software 32 resides in the processor 38. The software 32 comprises a plurality of algorithms 42 for implementing a plurality of the aforementioned procedures for improving the locomotive's acceleration rate. The locomotive's dynamic brake system 26 and engine 24 are connected to the processor 38 by way of a controller system 30 that is operable to control the dynamic brake system 26 and/or the engine 24.

Figure 17:
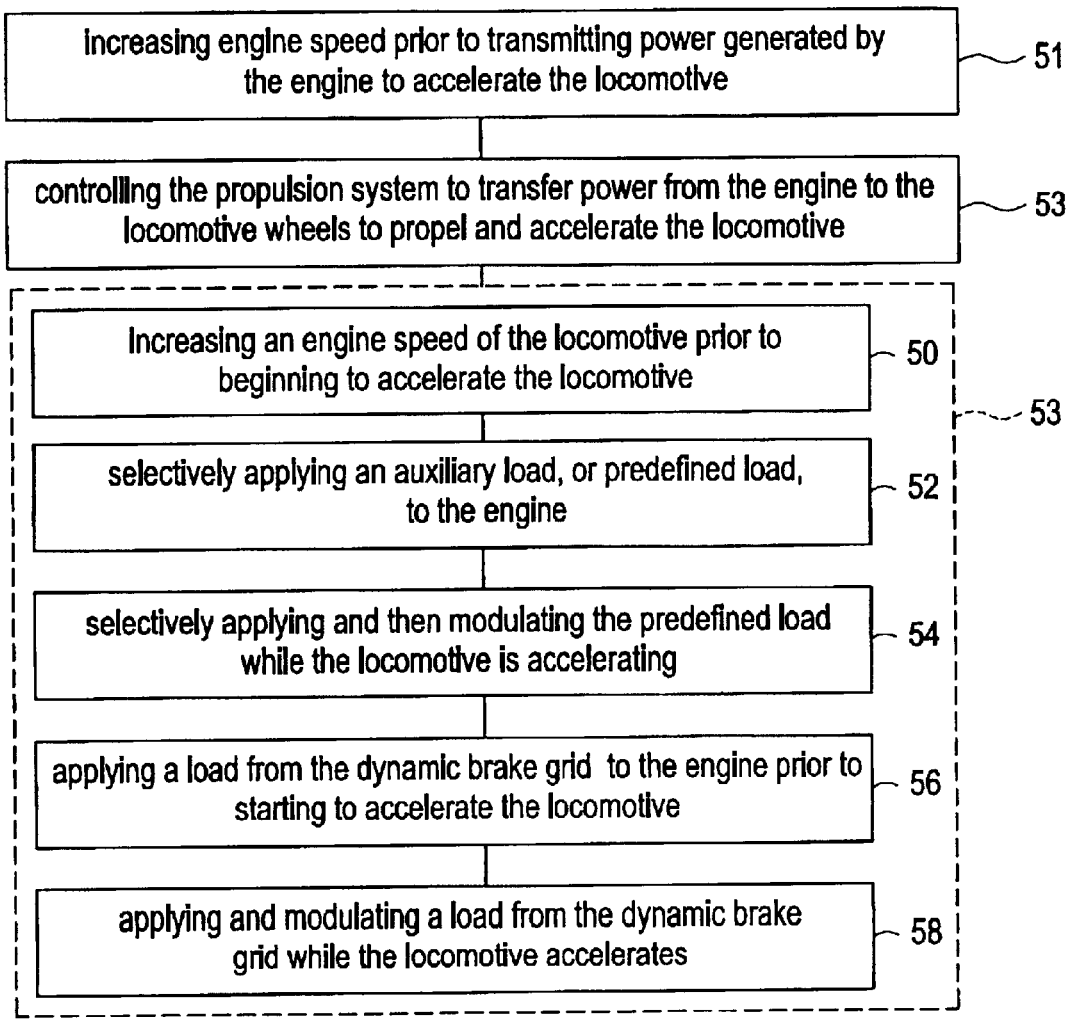
FIG. 17 is an illustration of an exemplary block diagram comprising approaches to improve acceleration.

In operation, as illustrated in FIG. 17, an approach is provided using the methods discussed above wherein the embodiment may be used alone or in combination. In general, the method comprises increasing engine speed prior to transmitting power generated by the engine to accelerate the locomotive, Step 51 and then controlling the propulsion system to transfer power from the engine to the locomotive wheels to propel and accelerate the locomotive, Step 53. More specifically, controlling the propulsion system comprises one of several steps. One step is increasing an engine speed of the locomotive prior to beginning to accelerate the locomotive, Step 50. Another step is selectively applying an auxiliary load, or predefined load, to the engine, Step 52. Another step is selectively applying and then modulating the predefined load while the locomotive is accelerating, Step 54. Another step is applying a load from the dynamic brake grid to the engine prior to starting to accelerate the locomotive, Step 56. A final step is applying and modulating a load from the dynamic brake grid while the locomotive accelerates, Step 58.

Figure 18:
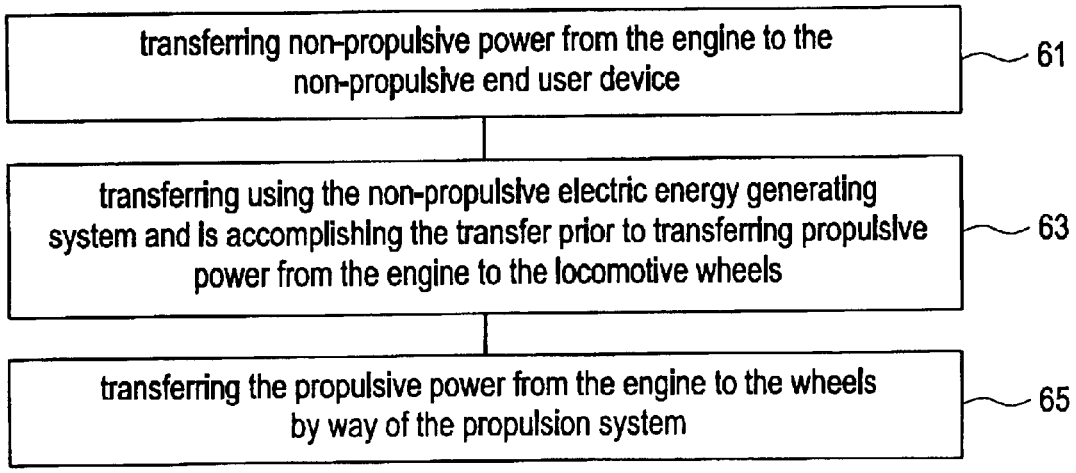
FIG. 18 is an exemplary flow chart of a method to improve acceleration.

In another preferred embodiment of operation, as illustrated in FIG. 18, in general the method comprises transferring non-propulsive power from the engine to the non-propulsive end user device, Step 61. This transfer is accomplished with the non-propulsive electric energy generating system and is accomplished prior to transferring propulsive power from the engine to the locomotive wheels, Step 63. The propulsive power from the engine is then transferred to the wheels by way of the propulsion system, Step 65.

While the invention has been described in what is presently considered to be a preferred embodiment, many variations and modifications will become apparent to those skilled in the art. Accordingly, it is intended that the invention not be limited to the specific illustrative embodiment, but be interpreted within the full spirit and scope of the appended claims.

What is claimed is:

1. In a railroad locomotive having a diesel engine and an electro-motive propulsion system for transforming and transmitting power from the engine to wheels of the locomotive for propelling the locomotive, a method of reducing the time required to transmit power at a predetermined level of power to the wheels to propel the vehicle comprising:

increasing engine speed to approximately a maximum engine speed prior to transmitting power generated by the engine to propel the locomotive; and thereafter controlling the electro-motive propulsion system to transfer power from the engine to the locomotive wheels to propel and accelerate the locomotive.

2. The method of claim 1 wherein the step of controlling the electro-motive propulsion system further comprises selectively applying a predefined load to the engine prior to transmitting power to propel the locomotive.

3. The method of claim 1 wherein the step of controlling the electro-motive propulsion system further comprises selectively applying a predefined load to the engine while propelling the locomotive.

4. The method of claim 3 further comprising selectively modulating the predefined load while propelling the locomotive.

5. The method of claim 3 wherein selectively applying and modulating the predefined load further comprises turning the predefined load on and off over a given time period.

6. The method of claim 3 further comprising modulating the predefined load with a processor.

7. The method of claim 3 further comprising transmitting signals from an input device external to the processor to control the modulation of the predetermined load.

8. The method of claim 7 wherein the external input device is at least one of a remote sensor, wayside station, track sensor, and on-board switch.

9. The method of claim 1 wherein the step of increasing engine speed further comprises increasing engine speed after a door on a passenger car closes.

10. In a railroad locomotive having a diesel engine, an electro-motive propulsion system for transforming and transmitting propulsive power from the engine to wheels of the locomotive for propelling the locomotive, and a non-propulsive electric energy generating system for transforming and transmitting non-propulsive power from the engine to a non-propulsive electric power end use device on the locomotive, a method of reducing the time required to transmit propulsive power at a predetermined level of power to the wheels to propel the locomotive comprising:

transferring non-propulsive power at a predetermined level of power from the engine to the non-propulsive electric power end user device via the non-propulsive electric energy generating system prior to transferring propulsive power from the engine to the wheels to propel the locomotive; and thereafter transferring propulsive power from the engine to the wheels via the electro-motive propulsion system to propel and accelerate the locomotive.

11. The method of claim 10 wherein the predetermined level of power for the non-propulsive power is approximately the maximum power generated by the engine.

12. The method of claim 11 wherein the level of power for the non-propulsive power is reduced as the locomotive accelerates, so that an increased level of power for the propulsive power is transmitted to the wheels as the locomotive accelerates.

13. The method of claim 12 further comprising varying the level of power for the non-propulsive power during locomotive acceleration, thereby controlling the increase in propulsive power transmitted from the engine to the wheels as the locomotive accelerates.

14. The method of claim 13 wherein the non-propulsive end use device comprises one or more devices chosen from a group comprising a dynamic braking grid, an auxiliary power end use device and a head end power inverter, and wherein the varying of the power level of non-propulsive power for the non-propulsive power end use device comprises varying the level of power dissipated at the non-propulsive end use device.

15. The method of claim 10 further comprising increasing engine speed to approximately a maximum engine speed prior to transmitting propulsive power generated by the engine to propel the locomotive, and thereafter controlling the electro-motive propulsion system to transfer propulsive power from the engine to the locomotive wheels to propel the locomotive.

16. A system for decreasing a time a locomotive takes to achieve a desired horsepower, the system comprising:

a processor;

a plurality of procedures comprising at least one of incresing the speed of an engine of the locomotive prior to starting the locomotive, applying an auxiliary load to the engine, and applying a dynamic brake grip load to the engine;

auxiliary control software residing in the processor comprising a plurality of algorithms for implementing said plurality of procedures;

dynamic brake system;

an engine;

a controller system connected to the processor operable to control at least one of the dynamic brake system and the engine; and wherein the processor selects one of the plurality of algorithms based on an operating condition of the locomotive and directs the controller system based on the one algorithm selected.

17. The system of claim 16 wherein the plurality of procedures are applied simultaneously.

18. The system of claim 16 wherein the plurality of procedures further comprises at least one of modulating the auxiliary load and modulating the dynamic brake grid load.

19. The system of claim 18 wherein modulating the auxiliary load and modulating the dynamic brake grid load are applied simultaneously.

20. The system of claim 18 wherein two of the plurality of procedures are applied simultaneously.

21. A system for decreasing a time a locomotive takes to achieve a desired horsepower, the system comprising:

a processor;

auxiliary control software residing in the processor comprising a plurality of algorithms for implementing a plurality of procedures for improving the acceleration rate;

dynamic brake system;

an engine;

a controller system connected to the processor operable to control at least one of the dynamic brake system and the engine;

wherein the processor selects one of the plurality of algorithms based on an operating condition of the locomotive and directs the controller system based on the one algorithm selected.

22. The system of claim 21 further comprising an auxiliary load generating component controlled by the controller system based on the one of the plurality of algorithms selected.

23. The system of claim 22 wherein the component is at least one of a blower, battery charger, cooling equipment, and heating equipment.

24. The system of claim 21 further comprising an input device external to the processor and in communication with the processor for transmitting signals to the processor for determining which of the procedures to apply.

25. The system of claim 24 wherein the external input device comprises a device monitoring at least one of position of the locomotive and a period of time during which the locomotive remains stopped.

26. The system of claim 21 further comprising a timer to determine a period of time during which the locomotive is stationary.

27. The system of claim 26 wherein the period of time is considered by the processor to determine a procedure to increase the acceleration.

28. The system of claim 21 wherein the dynamic brake system comprises chopper circuits.

29. The system of claim 28 wherein the chopper circuits are used to modulate the dynamic brakes.

30. The system of claim 21 further comprising a switch to activate the system.

31. The system of claim 30 wherein the switch is at least one of an automatic switch and a manual switch.

32. The system of claim 30 wherein the switch is connected to a door on a passenger car connected to the locomotive wherein the switch activates the system once the door is closed.

* * * * *